Jan. 25, 1927.

E. R. SPRINGER

GEAR SHIFT

Filed April 23, 1921

Edward R. Springer
INVENTOR

BY Victor J. Evans
ATTORNEY

Jan. 25, 1927.

E. R. SPRINGER

GEAR SHIFT

Filed April 23, 1921

EDWARD R. SPRINGER
INVENTOR

BY Victor J. Evans
ATTORNEY

Patented Jan. 25, 1927.

1,615,777

UNITED STATES PATENT OFFICE.

EDWARD R. SPRINGER, OF PRINCETON, ILLINOIS.

GEAR SHIFT.

Application filed April 23, 1921. Serial No. 463,761.

This invention relates to gear shifting mechanism for use in motor vehicles, and an object of the invention is to provide an improved gear shifting mechanism by means of which any preselected shifting lever may be operated for shifting the co-operating gear, but which mechanism is arranged to prevent shifting of the gears until the clutch has been released.

In present gear shifting structures, it is possible to shift the speed control or transmission gears while the clutch is in operation and thus the stripping of the gears often results due to shifting them while in operation and it is an object of the present invention to prevent such stripping of the gears and permit selective operation of the shifting mechanism and the shifting of the selective gears after selection and after the clutch has been released.

Another object of the invention is to provide an improvement on the gear shifting mechanism disclosed in Letters Patent Number 1,216,178 dated February 13, 1917, which improved structure is compact, requiring less space than that disclosed in the above mentioned patent and one which can be easily and conveniently operated.

Other objects of the invention will appear in the following detailed description and in the accompanying drawing wherein.

Figure 1:
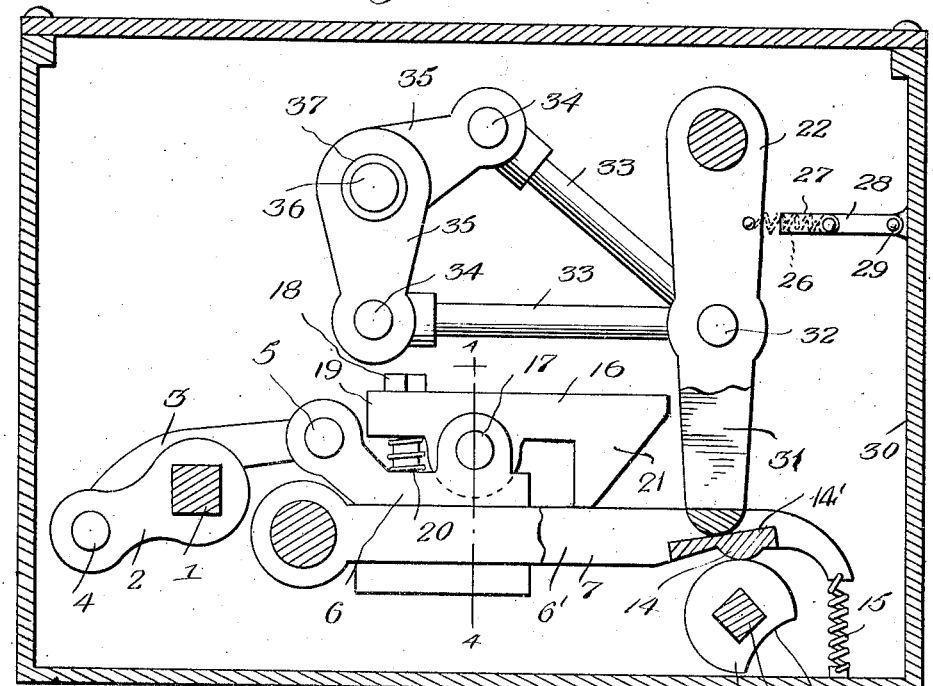
Fig. 1 is a side elevation of the improved gear shifting mechanism.
Figure 2:
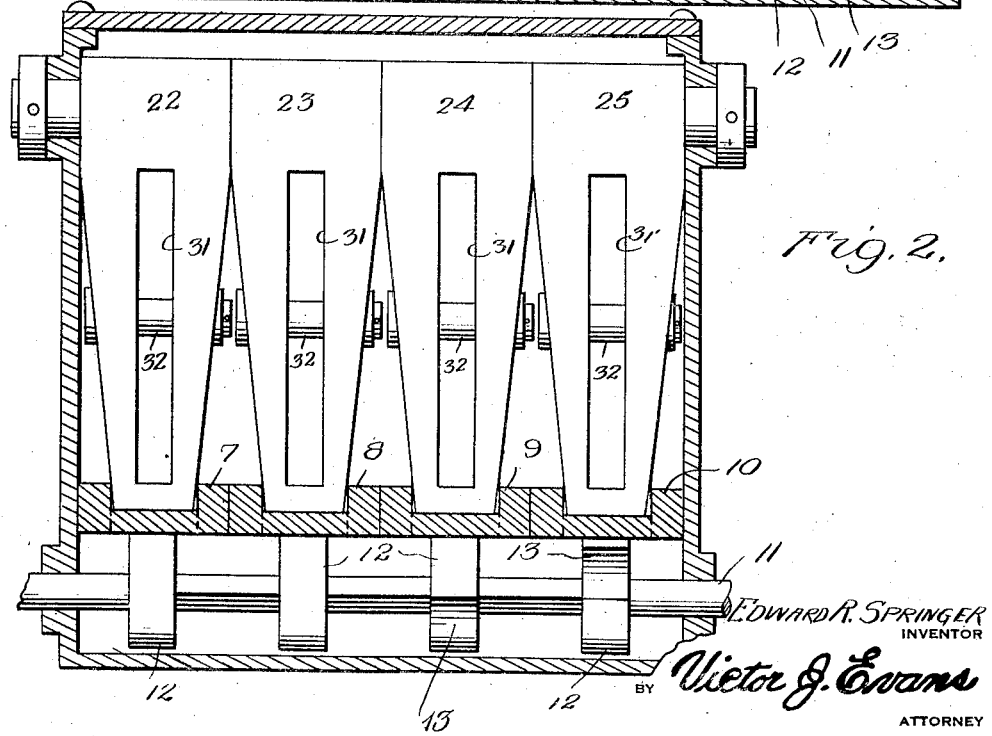
Fig. 2 is a front elevation of the improved gear shifting mechanism.
Figure 5:
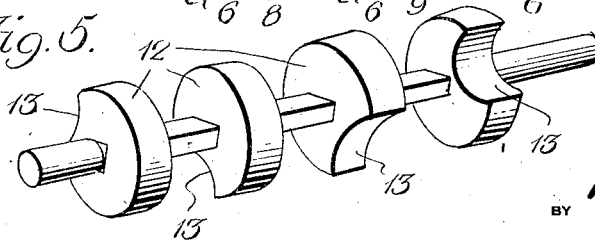
Figure 5 is a detail view of the shaft of the selecting mechanism and showing the arrangement of the cams thereon.

Referring more particularly to the drawing the improved gear shifting mechanism comprises a shaft 1 attached to a clutch pedal or a shifting lever of any approved type (not shown). The shaft 1 has a plurality of links 2 mounted thereon to which arms 3 are pivotaly connected as shown at 4. The arms 3 are in turn pivotally connected by pins 5 to cross heads 6 each of which is slidable in a slot 6' longitudinally arranged in each of the levers 7, 8, 9 and 10 as shown in Figures 1 and 2 of the drawings. The levers 7, 8, 9 and 10 co-operate with the selecting mechanism which comprises a rectangular shaft 11 having a plurality of cams 12 mounted thereon each of which is provided with a concave portion 13 in its perimeter adapted to receive therein a projection 14 one of which is formed on a bridging piece 14' of the levers 7, 8, 9 or 10 corresponding to the respective cams. The cams 13 are arranged on the shaft 11 in a manner whereby the concaved portions 13 thereof are out of alignment for a purpose which will be presently apparent. This arrangement also provides for a neutral position of the parts, or in other words the concaved portions 13 are disposed as shown in Figure 5 of the drawings. The shaft 11 is manually rotated for selecting the lever to be operated and the operation of the lever is permitted by the position of a concave portion 13 beneath a projection 14 of a selected lever and in position to receive the same when the lever is moved downwardly by the spring 15 one of which is connected to the free end of each of the levers 7, 8, 9 and 10.

Each of the cross heads 6 has a pawl 16 pivoted thereto as shown at 17, intermediate the ends of the pawl and the amplitude of movement of the pawls 16 is controlled by adjustment of set screws 18 which extend through the tails 19 of the pawls and engage the cross heads as shown in Fig. 1 of the drawing. Springs 20 are coiled about the set screws 18 and engage the cross heads 6 and tails 19 of the pawls 16 for retaining the latter under tension together with the heads 21 thereof. Pivotally mounted levers 22, 23, 24 and 25 are provided, one for each of the levers 7, 8, 9 and 10 and these levers 22, 23, 24 and 25 normally rest in vertical neutral positions being maintained therein by springs 26 which are arranged in the tubular housings 27 with their inner ends secured to the housings by means of the cross pieces 26'. These housings 27 are pivotally connected to the levers 28, the other ends of said levers being pivotally connected to the casing 30 as at 29, thus permitting the levers 22, 23, 24 and 25 to move in the direction opposite of that in which they are moved through the engagement of the pawls 16 or in other words the springs aid in maintaining the levers in such neutral position.

The levers 22, 23, 24 and 25 are provided with central elongated openings 31 through which wrist pins 32 transversely extend. Rods 33 are connected to the wrist pins 32 by pivotal connections and as shown at 34 to arms 35 which are mounted upon a shaft 36, the shaft 36 is attached to the gear transmission mechanism (not shown but which may be of any conventional type). Two of the arms 35 are carried by the shaft 36 and the other two arms by sleeves 37 which are loosely mounted upon the shaft 36, the rods 33 and arms 35 are normally arranged as shown in Figure 1 but upon shifting any of the levers 22, 23, 24 and 25, such movement will be transmitted to the shaft 36 or sleeves 37 which are in turn secured to means to shift the gears of the gear transmission mechanism. Two of said levers being adapted to control the first and reverse gears and the remaining levers the second and high gears.

Figure 3:
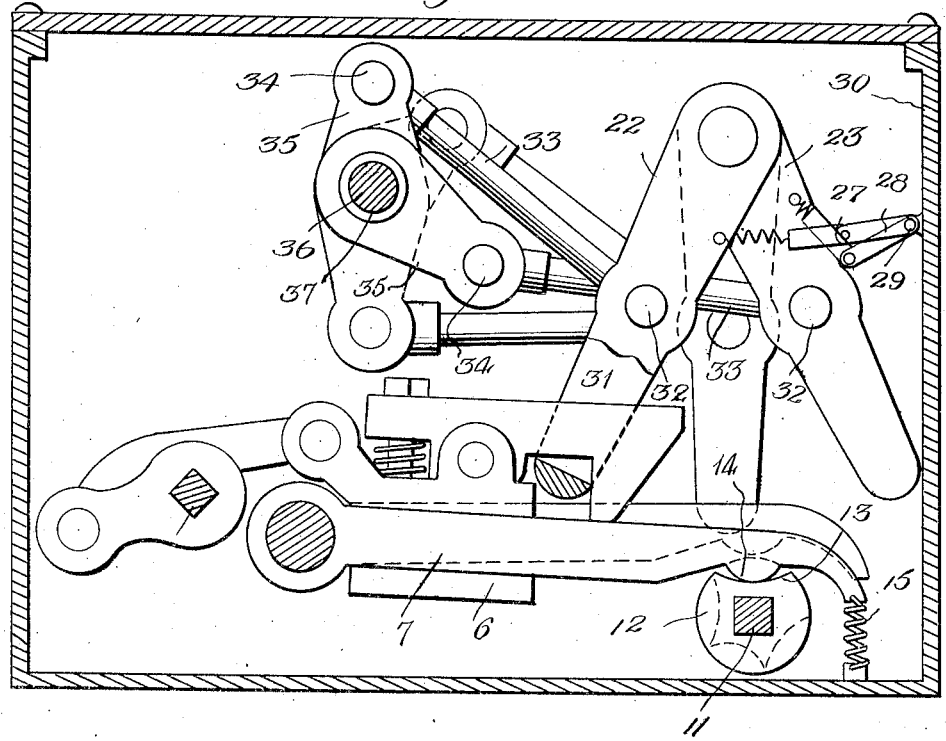
Fig. 3 is a side elevation of the gear shifting mechanism showing some of the parts in operated position.
Figure 4:
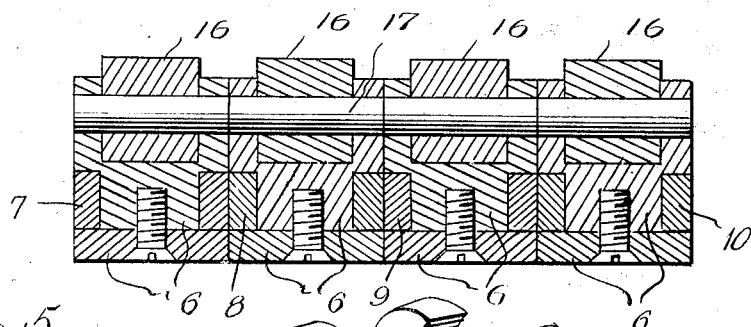
Fig. 4 is a cross section on the line 4—4 of Fig. 1.

In the operation of my gear shifting mechanism the shaft 11 is first manually rotated to bring one of the cams 12 in position relative to one of the respective levers 7, 8, 9 or 10, depending upon the gears to be shifted into operative relation, and when the clutch pedal is rocked, it will rock the shaft 1 moving the cross heads 6 in the slot of the selected levers 7, 8, 9 and 10, one of which has been permitted to drop by its co-operating cam 12 as shown in Figure 3, and moving the pawl 16 carried thereby to allow the head 21 of the operated pawl to pass through the lower portion of the elongated opening 31 in one of the levers 22, 23, 24, or 25 corresponding to the levers 7, 8, 9 or 10 operated, permitting operative connection of the pawls to engage the cross pieces at the lower end of the openings 31 and shifting lever 22 for shifting the corresponding gear through the medium of the corresponding arms 35 and of the sleeves or shaft 36.

The gear that has been shifted through the medium of the structure as above set forth and in the manner stated is returned to normal position by first moving the shaft 11, so that all of the concaved portions are disposed out of registration or alignment with the projections 14; the shaft 1 is then rocked to move the cross heads forward so that one of the heads will engage the lever which has been previously moved to operative position as suggested in Figure 3, and this action will move the levers, in alignment as suggested in Figure 1, which discloses the normal position of the respective parts. This action will shift the gears to the normal position as will be readily apparent.

It is, of course, to be understood that the invention may be constructed in various other manners and the parts associated in different relations and, therefore I do not desire to be limited in any manner except as set forth in the claims hereunto appended.

Having thus described my invention what I claim is:

1. In a gear shifting meachanism, a plurality of shifting levers, control levers therefor, selective cams for controlling operation of said control levers, cross heads mounted for slidable movement in recesses formed in the control levers and pawls carried by said cross heads and adapted to operatively engage the shifting levers upon operation of the control levers.

2. In a gear shifting mechanism, a plurality of shifting levers, control levers therefor, selective cams for controlling operation of said control levers, cross heads mounted for slidable movement in recesses formed in the control levers, pawls carried by said cross heads and adapted to operatively engage the shifting levers upon operation of the control levers, means for regulating the amplitude of movement of said pawls, and means for maintaining said shifting levers normally in neutral position.

3. In a gear shifting mechanism, a plurality of shifting levers, control levers therefor, a rotatable shaft, selective cams on said shaft for controlling operation of said control levers, cross heads carried by said control levers, pawls pivotally carried by said cross heads and adapted for co-operation with said shifting levers, and means for shifting said cross heads to move said pawls into operative relation with the shifting levers upon operation of the control levers.

In testimony whereof I affix my signature.

EDWARD R. SPRINGER.